(12) United States Patent
Jain et al.

(10) Patent No.: US 7,778,869 B2
(45) Date of Patent: Aug. 17, 2010

(54) FAIR DISCOUNTING AUCTION

(75) Inventors: Kamal Jain, Bellevue, WA (US);
Mallesh M. Pai, Evanston, IL (US);
Rakesh Vinay Vohra, Wilmette, IL (US)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 11/761,686

(22) Filed: Jun. 12, 2007

(65) Prior Publication Data

US 2008/0313027 A1 Dec. 18, 2008

(51) Int. Cl.
*G06Q 30/00* (2006.01)
*G06Q 40/00* (2006.01)

(52) U.S. Cl. .............. 705/14.14; 705/14.34; 705/14.39; 705/37; 726/26

(58) Field of Classification Search .............. 705/14, 705/10, 14.14, 14.34, 14.39
See application file for complete search history.

(56) References Cited

U.S. PATENT DOCUMENTS

| | | | | |
|---|---|---|---|---|
| 4,334,270 A | * | 6/1982 | Towers ...................... | 705/36 R |
| 4,412,287 A | * | 10/1983 | Braddock, III ............... | 705/37 |
| 4,827,508 A | * | 5/1989 | Shear .......................... | 705/53 |
| 5,839,119 A | * | 11/1998 | Krsul et al. .................... | 705/39 |
| 5,892,900 A | * | 4/1999 | Ginter et al. .................. | 726/26 |
| 5,973,683 A | * | 10/1999 | Cragun et al. ................ | 715/719 |
| 6,044,363 A | * | 3/2000 | Mori et al. .................... | 705/37 |
| 6,366,891 B1 | | 4/2002 | Feinberg | |
| 6,606,608 B1 | * | 8/2003 | Bezos et al. ............... | 705/36 R |
| 6,985,885 B1 | * | 1/2006 | Goldberg et al. ............ | 705/37 |
| 7,006,987 B1 | | 2/2006 | Xie et al. | |
| 7,010,511 B1 | * | 3/2006 | Kinney et al. ................ | 705/37 |
| 7,058,602 B1 | * | 6/2006 | La Mura et al. .............. | 705/37 |
| 7,124,107 B1 | | 10/2006 | Pishevar et al. | |
| 7,177,832 B1 | * | 2/2007 | Semret et al. ................ | 705/37 |
| 7,415,436 B1 | * | 8/2008 | Evelyn et al. ................ | 705/37 |
| 7,480,627 B1 | * | 1/2009 | Van Horn et al. ............. | 705/26 |
| 2002/0023050 A1 | * | 2/2002 | Wakabayashi ............... | 705/37 |
| 2002/0052781 A1 | * | 5/2002 | Aufricht et al. ............... | 705/14 |

(Continued)

OTHER PUBLICATIONS

Combinatorial and Quantity-Discount Procurement Auctions Benefit Mars, Incorporated and Its Suppliers http://pubsonline.informs.org/feature/Edelman/1526-551X-2003-33-01-0023R.pdf.

(Continued)

*Primary Examiner*—James W Myhre
*Assistant Examiner*—Adam Chornesky
(74) *Attorney, Agent, or Firm*—Lee & Hayes, PLLC

(57) ABSTRACT

The claimed subject matter provides a system and/or a method that facilitates employing an online auction in which a coupon is fairly administered. An online auction environment that can employ an auction to identify a fair market value of at least one of a good or a portion of a service, wherein the auction can receive at least one bid from a bidder with a coupon and a bidder without a coupon. A randomizer component that can select one of a collection of bidders having coupons or a collection of bidders not having coupons based on a randomizing technique, wherein the online auction environment can identify an auction winner as a highest bidder within the selected collection, the highest bidder provides a highest bid from both the collection of bidders having coupons and the collection of bidders not having coupons.

19 Claims, 10 Drawing Sheets

U.S. PATENT DOCUMENTS

| | | | |
|---|---|---|---|
| 2002/0077982 A1* | 6/2002 | Pellegrini | 705/41 |
| 2002/0111898 A1 | 8/2002 | Numaoka et al. | |
| 2002/0138390 A1* | 9/2002 | May | 705/37 |
| 2003/0033236 A1* | 2/2003 | Davenport et al. | 705/37 |
| 2003/0041010 A1* | 2/2003 | Yonao-Cowan | 705/37 |
| 2003/0093360 A1* | 5/2003 | May | 705/37 |
| 2003/0195838 A1* | 10/2003 | Henley | 705/37 |
| 2004/0122735 A1* | 6/2004 | Meshkin | 705/14 |
| 2004/0193489 A1* | 9/2004 | Boyd et al. | 705/14 |
| 2004/0220858 A1* | 11/2004 | Maggio | 705/14 |
| 2006/0117341 A1* | 6/2006 | Park | 725/34 |
| 2006/0122879 A1 | 6/2006 | O'Kelley | |
| 2006/0188109 A1* | 8/2006 | Makino et al. | 381/86 |
| 2007/0011050 A1* | 1/2007 | Klopf et al. | 705/14 |
| 2007/0022442 A1* | 1/2007 | Gil et al. | 725/62 |
| 2007/0050251 A1* | 3/2007 | Jain et al. | 705/14 |
| 2007/0054718 A1* | 3/2007 | Del Prado | 463/1 |
| 2007/0078716 A1* | 4/2007 | Tews | 705/14 |
| 2007/0087756 A1* | 4/2007 | Hoffberg | 455/450 |
| 2007/0112597 A1* | 5/2007 | Heckerman et al. | 705/2 |
| 2007/0136608 A1* | 6/2007 | Kirovski et al. | 713/193 |
| 2007/0244757 A1* | 10/2007 | Walter | 705/14 |
| 2008/0154761 A1* | 6/2008 | Flake et al. | 705/37 |
| 2008/0313027 A1* | 12/2008 | Jain et al. | 705/14 |

OTHER PUBLICATIONS

The Effects of Advertising on Customer Retention and the Profitability of Auctions http://www.andrew.cmu.edu/user/alm3/papers/advertising%20auctions.pdf.

On Approximating Optimal Auctions http://iew3.technion.ac.il/~amirr/aproxAuct7.pdf.

* cited by examiner

FAIR DISCOUNTING AUCTION

BACKGROUND

Computing and network technologies have transformed many aspects of everyday life. Computers have become household staples rather than luxuries, educational tools and/or entertainment centers, and provide individuals and corporations with tools to manage and forecast finances, control operations such as heating, cooling, lighting and security, and store records and images in a permanent and reliable medium. Networking technologies like the Internet provide individuals virtually unlimited access to remote systems, information and associated applications.

As computing and network technologies have evolved and have become more robust, secure and reliable, more consumers, wholesalers, retailers, entrepreneurs, educational institutions and the like are shifting paradigms and are employing the Internet to perform business rather traditional means. For example, today consumers can access their bank accounts on-line (e.g., via the Internet) and can perform an ever growing number of banking transactions such as balance inquiries, fund transfers, bill payments, and the like.

Typically, an on-line session can include individuals interfacing with client applications (e.g., web services) to interact with a database server that stores information in a database accessible to client applications. For instance, a stock market web site can provide users with tools to retrieve stock quotes and purchase stock. Users can enter stock symbols and request stock quotes by performing mouse clicks to activate a query. Client applications can then query databases containing stock information and return appropriate stock quotes. Users, based on returned stock quote information, can thereafter purchase or sell stocks by supplying suitable information, wherein submitting buy or sell orders initiate database queries to return current pricing information and order status.

Based on the ever-increasing use of the computer and/or the Internet, numerous transactions related to goods, services, and/or commerce have become common place. Furthermore, many features and characteristics associated with a traditional in-store (e.g., brick and mortar) transaction are available to consumers online using the computer and/or the Internet. For example, websites offer numerous payment methods (e.g., check, cash, cash on delivery, credit card, third-party payment services, etc.), goods/service details (e.g., informative brochure, user guide, instruction booklet, warranty information, etc.), images, views, customer service, returns, exchanges, rewards programs, and incentive coupons/discounts. With respect to coupons and/or discounts, there is a common deficiency in which such coupons and/or discounts are not being utilized in a fair manner.

Such unfairness is highly exposed in connection with online auction environments. Since the coupon and/or discount may not be offered to an entire bidding pool within the online auction environment, the good or service being auctioned may not be evaluated at a true market value reflective of the bidder(s) with coupons/discounts. For example, a person with a coupon will have a slightly higher price evaluation of a good or service since the coupon will give a discount. Thus, if a person normally values a good or service at ten dollars, a coupon that gives one dollar off will raise the evaluation of the good or service to eleven dollars (e.g., the total bidding price would still be ten dollars with use of the coupon). In other words, individuals with coupons and/or discounts typically have an unfair advantage in the online auction environment which is counter productive to identifying a true fair market value of a good or service. Additionally, the unfairness of such coupons and/or discounts is present within an advertisement auction setting since advertisements are typically sold on the Internet using a spot market and/or auction technique.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate utilizing a coupon or a discount in an online auction environment in a uniform and/or fair manner. A randomizer component can utilize a randomizing technique in connection with an online auction environment in order to maintain fairness therewith. In particular, the randomizer component can employ the randomizing technique with an auction initiated by the online auction environment in order to ensure coupons and/or discounts are fairly administered. In general, the online auction environment can ascertain a fair market value for any suitable good or service by receiving bids from consumers, wherein the online auction environment can reflect each consumer's fair market evaluation or true market value of such good or service. However consumer's fair market evaluation or true market value of goods or services can be skewed and/or affected by the use of coupons/discounts. The randomizer component can utilize the randomizing technique to select a potential auction winner from at least one of a collection of bidders with coupons or a collection of bidders without coupons. In general, an auction winner must be the highest bidder amongst all participants (e.g., regardless of coupon/discount or not) and be a member of the randomly selected collection of bidders (e.g., collection of bidders with coupons or collection of bidders without coupons). In other aspects of the claimed subject matter, methods are provided that facilitate randomizing whether to select an auction winner from a collection of bidders with coupons or a collection of bidders without coupons.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
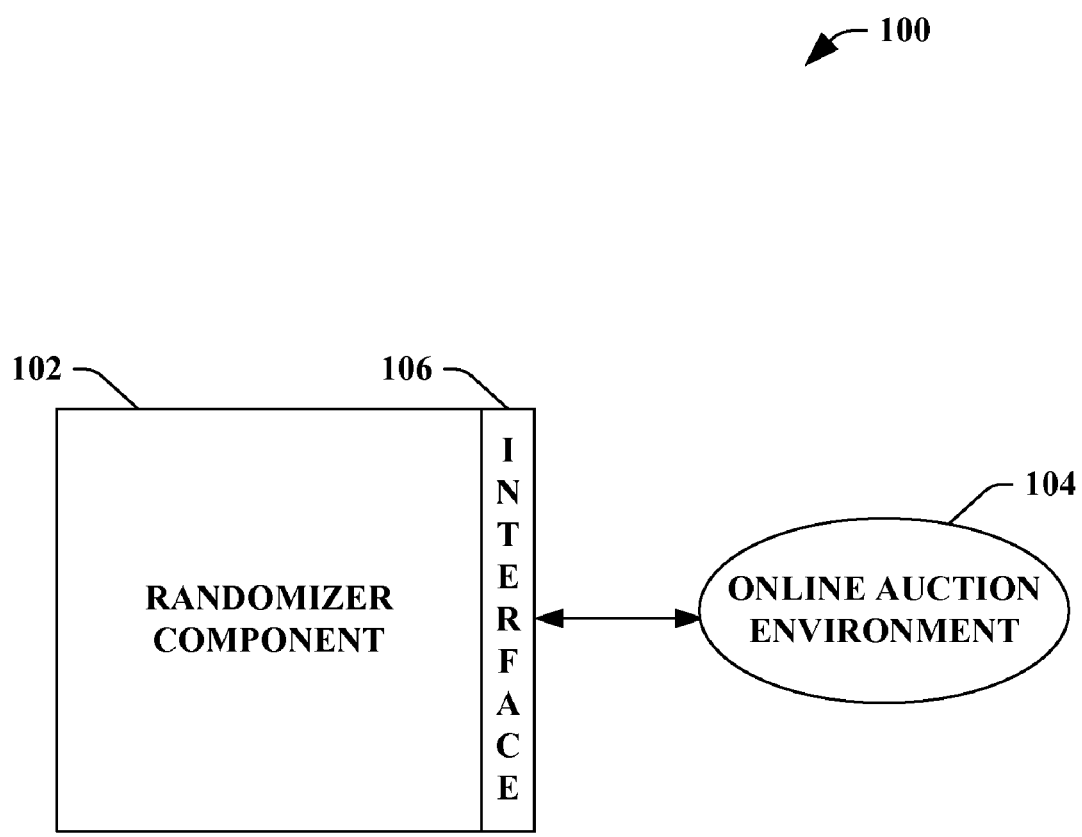
FIG. 1 illustrates a block diagram of an exemplary system that facilitates utilizing a coupon or a discount in an online auction environment in a uniform and/or fair manner.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "auction," "model," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates utilizing a coupon or a discount in an online auction environment in a uniform and/or fair manner. The system 100 can include a randomizer component 102 that can employ a randomizing technique in connection with an online auction environment 104 via an interface 106 (discussed in more detail below) in order to determine whether an auction winner is identified within a collection of bidders having coupons/discounts or a collection of bidders not having coupons/discounts. In general, the online auction environment 104 can ascertain a fair market value for any suitable good or service by receiving bids from consumers, wherein the online auction environment 104 can reflect each consumer's fair market evaluation or true market value of such good or service. However, conventional auctions fail to consider the use of coupons and/or discounts by auction participants (e.g., bidders) which can skew such fair market evaluations and/or true market values based on an unfair advantage to bidders with coupons and/or discounts giving lower prices and/or additional benefits. With the randomizer component 102 employing a randomizing technique to select a collection of bidders (e.g., either a collection of bidders having a coupon/discount or a collection of bidders not having a coupon/discount) that can be the potential auction winner (e.g., dependent upon if the bidder is within the selected collection and provides the highest bid amongst all collections), the use of coupons and/or discounts is placed on a level and fair playing field. In other words, the randomizer component 102 enables the online auction environment 104 to receive bids from a plurality of bidders (e.g., bidders with coupons, bidders without coupons, etc.) and selecting an auction winner in a fair and unbiased manner while maintaining the fair market value evaluation/determination.

For instance, the online auction environment 104 can employ an online auction to sell a good, wherein at least one bid is received from a bidder with a coupon or a bidder without a coupon. Typically, the bidder with a coupon would have an unfair advantage over the bidder without a coupon based at least in part upon an additional benefit attached to such coupon. However, the randomizer component 102 can randomly select whether the auction is for a pool/collection of bidders with coupons or a pool/collection of bidders without coupons, but still receiving bids from both collections. By utilizing this randomization technique, the system 100 allows coupons and/or discounts to be utilized within the online auction environment 104 in a fair and uniform manner.

The online auction environment 104 can be any suitable environment that receives bids in order to identify a true market value and/or fair market value of at least one of a good or a portion of service. For example, the online auction environment 104 can employ any suitable auction such as, but not limited to, a standardized high-bid winner auction, a Vickrey auction, a Dutch auction, a second price auction, a silent auction, a sealed-bid auction, and a mixed goods auction. Furthermore, the subject innovation can relate to any suitable coupon and/or discount, wherein the coupon and/or discount can provide an additional benefit in comparison to a bidder not having such coupon and/or discount. For instance, the coupon can be a discount, a promotion, a bundled product, a bundled service, a free good, a free service, a percent discount, a monetary value discount, a rebate, any monetary benefit bundled with a purchase, any benefit coupled with a purchase, etc.

It is to be appreciated that the auction can relate to any good and/or service. In particular, the subject innovation can be utilized in an auction associated to the sale for an ad unit related to online advertising. The ad unit can be sold to the highest bidder at the fair market value and/or true market value defined as the ad price. It is to be appreciated that the ad price can be a price related to most any suitable portion of an ad unit (e.g., also referred to as advertising unit). The subject innovation is intended to include most any suitable and/or potential ad unit utilized by a publisher for advertisement, wherein an ad unit can be a specific location on a page and/or website that an ad can be rendered. In other words, the potential ad unit can relate to a website, webpage, RSS stream etc. that can be sold to advertise a particular item, good, service, a disparate ad, any suitable entity related to commerce, and/or any suitable combination thereof. Furthermore, the ad price can relate to most any suitable amount, group, bundle, and/or number of the potential ad units. For example, a publisher can sell a percentage of potential ad unit(s) displays and/or a fixed amount of such potential ad unit(s) displays. Still further, the potential ad unit can relate to most any suitable position on the website, webpage, page, etc. For instance, typical techniques refer to a position 1 as an upper-echelon location for an ad (e.g., a location at a top portion, a top-most portion, etc.). However, it is to be appreciated that the particular location of an ad can be most any suitable location and the claimed subject matter is intended to include various positions for the ads. Accordingly, each ad with respective position (discussed in more detail below and in FIG. 8) can include a particular price ascertained by the online auction environment 104.

Additionally, the online auction environment 104 can implement most any suitable measurement related to an advertising industry that can assist in estimating traffic related to the particular portion of advertisement to which a price is to be generated. Specifically, the online auction environment 104 can provide a fractional rotation for the advertisement, a cost/price per click (CPC), a price per 1000 impressions (CPM), a price per N impression (where N is a positive integer), and/or most any suitable unit of measurement related to the sale of a portion of a potential ad unit. For example, the online auction environment 104 can identify a particular price for a potential ad unit based on received bids, wherein the price is based on a fractional rotation of such potential ad unit. Moreover, in a disparate example, the online auction environment 104 can establish the ad price based upon the received bids such that the price relates to a cost per click (CPC).

In addition, the system 100 can include any suitable and/or necessary interface component 106 (herein referred to as "interface 106"), which provides various adapters, connectors, channels, communication paths, etc. to integrate the randomizer component 102 into virtually any operating and/or database system(s), online auction environment 104, and/or any combination thereof. In addition, the interface component 106 can provide various adapters, connectors, channels, communication paths, etc., that provide for interaction with the randomizer component 102, the online auction environment 104, and any other device and/or component associated with the system 100.

Figure 2:
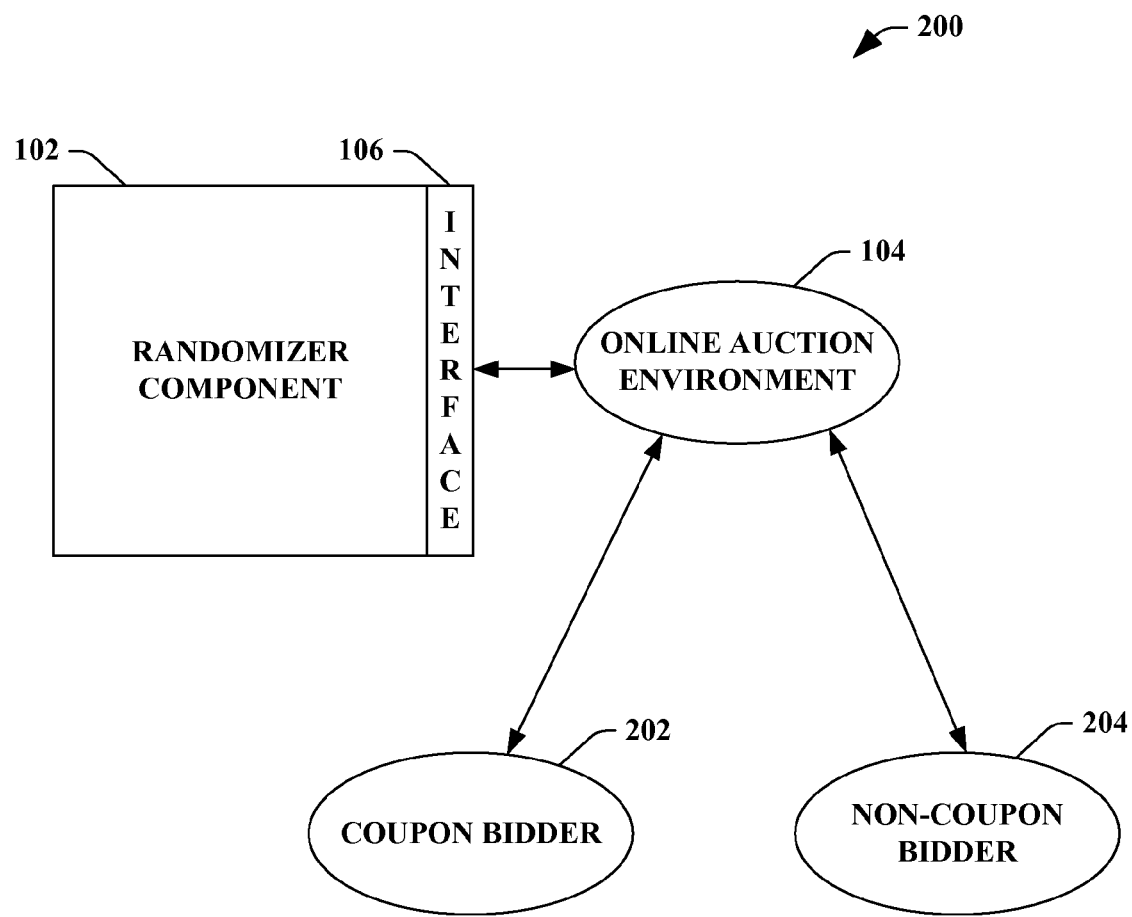
FIG. 2 illustrates a block diagram of an exemplary system that facilitates employing a fair auction with bidders with coupons and/or bidders without coupons.

FIG. 2 illustrates a system 200 that facilitates employing a fair auction with bidders with coupons and/or bidders without coupons. The system 200 can include the randomizer component 102 that implements a randomizing technique to the online auction environment 104 in order to ascertain whether a winning bidder (e.g., highest bidder) is selected from bidders having coupons or from bidders not having coupons, wherein the winning bidder must be the highest bidder from both groups/collections (e.g., bidders having coupons and bidders not having coupons). It is to be appreciated that the randomizer component 102 can initiate the randomizing technique at any point for an auction such as, but not limited to, before a start of an auction, a start of an auction, an end of an auction, any point of time between the start of the auction and the end of the auction, after a conclusion of an auction, etc. Moreover, it is to be appreciated that the randomizer component 102 can utilize any suitable randomizing technique, such as, but not limited to, a coin flip, a mathematical equation simulating random outcomes, a random number generator with numbers designating outcomes, a mathematical equation simulating a randomness of a coin flip, etc.

The online auction environment 104 can identify a real time fair market value or true market value of any suitable good or service based upon receiving bids from consumers reflecting respective worth. It is to be appreciated the online auction environment 104 can receive at least one bid from a coupon bidder 202 and a non-coupon bidder 204, wherein the coupon bidder 202 can utilize a coupon and/or discount on the potential purchase and the non-coupon bidder 204 does not have the ability to utilize a coupon and/or discount on the potential purchase. For example, at the start of the auction, the randomizer component 102 can determine whether the auction will select a potential winner (e.g., potential in that the winning bidder must be the highest bidder amongst all participating bidders) from bidders with coupons (e.g., coupon bidder 202) or from bidders without coupons (e.g., non-coupon bidder 204). Once the randomizer component 102 identifies whether the auction is for a group/collection of coupon bidders 202 or for a group/collection of non-coupon bidders 204, an auction winner can be identified by submitting the highest bid and being within the selected group/collection based on the randomization. In other words, the auction winner is identified by having the highest bid but must also be from one the selected collection/group (e.g., a collection of coupon bidders 202 or a collection of non-coupon bidders) based on the randomization technique.

Once identified as the highest bidder and/or auction winner by having the highest bid amongst all bidders and being within the randomly selected collection of bidders (e.g., having coupons and not having coupons), the price of the good or service can be identified based upon the auction type (e.g., high bid conventional auction, $2^{nd}$ price auction, Vickrey auction, etc.). If the randomizer component 102 randomly identifies coupon bidders 202 as the collection/group to which the winner can be identified, the price for the good or service can be the coupon bidders 202 winning bid (e.g., the highest bid, the $2^{nd}$ highest price in a $2^{nd}$ price auction, etc.) including the coupon and/or discount. If the randomizer component 102 randomly identifies non-coupon bidders 204 as the collection/group to which the winner can be identified, the price for the good or service can be the maximum price between 1) the price associated with the non-coupon bidders 204 winning bid; and 2) the price associated with the coupon bidders 202 highest bid including coupon and/or discount.

Take for instance, a $2^{nd}$ price auction example for an ad unit on a particular website or page, where a coupon can provide one (1) dollar off the sale price. The auction can receive bids from a first bidder with a coupon, a second bidder without a coupon, a third bidder without a coupon, and a fourth bidder with a coupon. Accordingly, there can be a collection/group of bidders with coupons (e.g., first bidder and fourth bidder) and a collection/group of bidders without coupons (e.g., second bidder and third bidder). The randomizer component 102 can utilize a randomizing technique (e.g., a coin flip) to determine whether or not the auction will be for the collection of bidders with coupons (e.g., designated by tails on a coin) or the collection of bidders without coupons (e.g., designated by heads on a coin). If the coin flip is heads, the auction winner will be from the collection of bidders without coupons if such bidder was the highest bidder from both groups/collections. If the coin flip is tails, the auction winner will be from the collection of bidders with coupons if such bidder was the highest bidder from both groups/collections. It is to be appreciated that in either case, the winner can be identified by the highest received bid.

For instance, the first bidder can bid twelve (12) dollars, the second bidder can bid ten (10) dollars, the third bidder can bid seven (7) dollars, and the fourth bidder can bid nine (9) dollars. If the coin flip is tails (e.g., auction for bidders with coupons), the auction winner would be the first bidder (e.g., highest bidder selected from the both collection of bidders and within the randomly selected collection). The first bidder would pay the price within the collection of bidders with coupons (e.g., nine dollars since it is a $2^{nd}$ price auction) including the coupon (e.g., one dollar off) for a sale price of eight (8) dollars. If the coin flip is heads (e.g., auction for bidders without coupons), there would not be an auction winner since the highest bidder within the collection of bidders without coupons was not the highest bidder amongst all bidders (e.g., first bidder was the highest bid).

However, in another example, the first bidder can bid ten (10) dollars, the second bidder can bid eleven (11) dollars, the third bidder can bid nine (9) dollars, and the fourth bidder can bid eight (8) dollars. If the coin flip is heads (e.g., auction for bidders without coupons), the auction winner would be the second bidder (e.g., highest bidder amongst both collection of bidders and within the randomly selected collection). Moreover, the second bidder would pay the maximum price between 1) the price associated with the non-coupon bidders winning bid (e.g., nine dollars since it is a $2^{nd}$ price auction) and 2) the price associated with the coupon bidders highest bid including coupon and/or discount (e.g., eight dollars since it is a $2^{nd}$ price auction minus one dollar), which gives the sale price of nine dollars (e.g., the maximum price between the choices).

Figure 3:
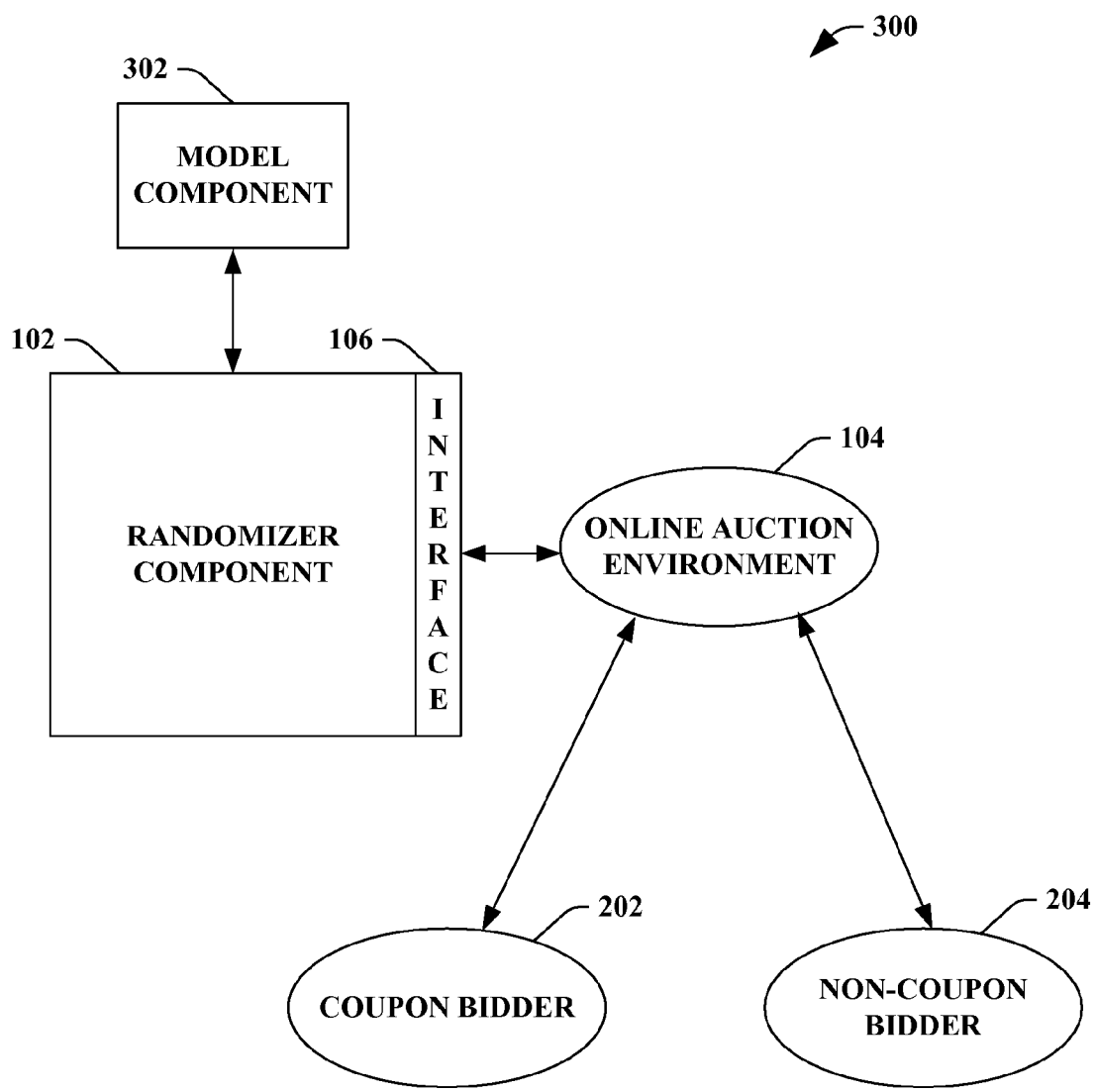
FIG. 3 illustrates a block diagram of an exemplary system that facilitates randomizing whether to select an auction winner from a collection of bidders with coupons or a collection of bidders without coupons.

FIG. 3 illustrates a system 300 that facilitates randomizing whether to select an auction winner from a collection of bidders with coupons or a collection of bidders without coupons. The system 300 can include the randomizer component 102 that can employ a randomizing technique in order to determine whether an auction initiated by the online auction environment 104 is to select an auction winner from a collection/group of coupon bidders 202 or a collection/group of non-coupon bidders 204 in order to provide a fair discounting auction. For example, an auctioneer associated with the online auction environment 104 can sell a single unit to a group of bidders using a second price auction. A subset of these bidders can possess a coupon entitling them to a discount off the winning bid in the event they win the auction. Bidders without the coupon are at a disadvantage relative to the situation when nobody has any coupons. Therefore, in a loose sense, these bidders end up sponsoring the coupon, at least partially. Furthermore the resulting allocation need not be efficient. The system 300 provides an alternative mechanism that allows the auctioneer to offer discount coupons to a set of bidders while not harming the rest. In other words, it is possible that the discount coupons are fully sponsored by the auctioneer and online auction environment 104. It is to be appreciated that the term 'fair' refers to desiderata that bound inefficient coupons within auctions and not to legal or ethical issues with said discounts.

A dominant player within a particular market often bundles successful products with their newly introduced products in order to promote the demand of the newly introduced product. This bundling can exist in the search portal business too. For example, advertisers who use the portal's electronic payment method (as opposed to others) can receive a discount in the auction. There can be at least two reasons for the existence of such schemes. The first is an attempt to extend market power in one offering to another via bundling. The second is that it is a less expensive alternative to a straight price cut on the ancillary service. Offering a discount in an auction raises issues that are absent with discounts in a posted-price mechanism.

A common theme however, is that discounts in auctions disadvantage some bidders and destroy the incentive properties of some auctions. As an illustration suppose two bidders and one good to be sold via second price auction. Bidder 1 has a private valuation for the good of $8, while bidder 2 has a private valuation of $9. Assume that if bidder 1 wins, he receives a 20% discount, e.g., he only has to pay 80% of the 2nd price. Bidding ones value is no longer a dominant strategy. If both bidders reveal their true valuations, bidder 2 wins the good and pays $8. However, if bidder 1 reports his valuation to be $10, he wins the auction, and pays 0.8×9, i.e. $7.2.

The system 300 is a direct revelation mechanism that would allow the auctioneer to offer discount coupons to a set of bidders while not hurting the rest. The system 300 proposes desiderata that such a mechanism should have and bound their inefficiency. Specifically, the system 300 can require that the mechanism be individually rational, dominant strategy incentive compatible and that does not, in some sense, disadvantage bidders who do not receive a discount.

The results can be derived in a model-free environment. By the revelation principle, attention can be restricted to direct revelation mechanisms (e.g., each bidder simply reveals his valuation) and the stronger dominant strategy notion of incentive compatibility is used, e.g., regardless of other bidders' valuations and bids, it is a dominant strategy for each bidder to report his true value.

The system 300 can include a model component 302 that can provide a model and/or notation with various reasonable axioms that satisfy specific mechanisms. For instance, the following can be satisfied by the model component 302 in order to employ the subject innovation: 1) The class of all deterministic mechanisms can be characterized in the 2 bidder case, e.g., one discounted and one un-discounted bidder. The model component 302 can show that no deterministic mechanism can be efficient, e.g. for any mechanism meeting the axioms, there exist profiles of valuations where the auctioneer can choose to withhold the good; 2) The model component 302 describes a randomized mechanism that achieves 50% efficiency in the worst case. This can be proven to be an upper-bound if the maximum possible discount is not fixed a priori; and 3) The model component 302 can show that if the maximum possible discount is known in advance, and it is strictly less than 100%, then there exist mechanisms that achieve more than 50% efficiency.

Consider seller wishing to sell a unique, indivisible object to n bidders. The set of bidders can be denoted by B, and is partitioned into two subsets, the discounted bidders, denoted by $B_D$, and the 'regular' bidders $B_R$. Each bidder I has a private valuation $v_i \in R_+$ for the good. The seller and buyers are risk neutral.

Attention can be restricted to direct revelation mechanisms (DRMs), where each buyer reveals his valuation to the auctioneer. A DRM can be characterized by an allocation function:

$$a: R_+^n \to [0,1]^n,$$

and a price function:

$$p: R_+^n \to R^n.$$

Further, the allocation must be feasible, e.g., at any profile of valuations $v \in R_+^n$, $$\sum_1^n a_i(v) \leq 1.$$

The model component 302 can further define and/or utilize 'reasonable' axioms that the mechanisms are required to process such as the following below.

Incentive Compatibility (IC): For any agent i, revealing his true valuation is a dominant strategy regardless of the bids of others, e.g., $$v_i \cdot a_i(v_i, v_{-i}) - p_i(v_i, v_{-i}) \geq v_i \cdot a_i(v'_i, v_{-i}) - p_i(v'_i, v_{-i}).$$

Individual Rationality (IR): At any profile of valuations v, for any bidder i, $v_i \cdot a_i(v) - p_i(v) \geq 0$.

Non-negative Prices (NP): All prices must be non-negative, e.g., $p: R_+^n \to R_+^n$.

Scale Free (SF): $\forall s \geq 0$, $a(sv) = a(v)$ and $p(sv) = sp(v)$, e.g., scaling all the bids by the same multiplicative factor does not change the allocations, and prices change by the same factor.

Non-triviality (NT): A mechanism is said to be non-trivial if $a(v) \neq 0$ for all $v \neq 0$.

Let $M = \{M^x \text{ such that } 0 \leq x \leq 1\}$ be a parameterized class of IR, IC and NP mechanisms. The mechanism $M^x$ in class M is intended to give a discount of x to bidders in $B_D$. The class M satisfies the following additional properties which can be referred to as Fair Discounting:

1) $M_0$ is anonymous.
2) For every $x > 0$, the following can be true:
  a) The bidders in $B_R$ have the same expected surplus as in $M_0$. In other words, for every profile of valuations v, and for any $i \in B_R$ there is $$v_i \cdot a_i^x(v) - p_i^x(v) = v_i \cdot a_i^0(v) - p_i^0(v).$$

This formalizes what it means for the discounts 'not to hurt' other (un-discounted) bidders.

b) $M^x$ gives the bidders in $B_D$ as much surplus as they would receive in $M_0$ if the regular bidders' bids were deflated by a factor of $(1-x)$.

$$v_i^x \cdot a_i^x(v) - p_i^x(v) = v_i \cdot a_i^0(v_{B_D}, (1-x)v_{B_R}) - p_i^0(v_{B_D}, (1-x)v_{B_R}).$$

As a note on the Fair Discounting axiom, the axiom formally defines what it means for the discount to not harm un-discounted bidders. The axiom also formalizes what it means for the discounted bidders to receive a discount of x.

The model component 302 can employ a deterministic mechanism. A deterministic mechanism is one where a: $R_+^n \to \{0,1\}^n$, e.g., the allocation rule is deterministic. The model component 302 can restrict to the case of 2 bidders. Bidder 1 is the discounted bidder and bidder 2 the regular bidder. It is to be appreciated that the results can extend to the case of >2 bidders, however, the notation is omitted for the sake of brevity.

Theorem 1: There does not exist any class M of deterministic mechanisms such that: for each $x \in [0,1]$, $M^x$ satisfies IC, IR, NP and NT; and in addition M satisfies Fair Discounting.

Note that mechanisms exist if the non-triviality requirement is dropped—in other words any acceptable deterministic mechanism will have to withhold the good at certain profiles. The proof of this theorem proceeds as follows. The mechanisms that satisfy IC, IR, NP and Fair Discounting can be characterized. It will be immediate that every such mechanism will withhold the good at some profiles, violating NT. The following 2 observations are standard properties of incentive compatible, individually rational and positive price mechanisms.

Observation 1: If at some profile $v = (v_1, v_2)$, $a_1(v) = 1$, then for all $v' = (v_1', v_2)$ where $v_1' > v_1$ we have that $a_i(v') = 1$. Similarly for bidder 2.

Proof: Suppose not. Suppose at v, $a_1(v) = 1$, but at some v', $a_1(v) = 0$. By IR, it can be shown that $v_1 \cdot 1 - p_1(v) \geq 0$. Further by NP, surplus of bidder 1 at v' is 0. However, $v_1' > v_1$ implies that $v_1 \cdot 1 - p_1(v) > 0$, violating IC.

Observation 2: At any profile $v = (v_1, v_2)$ $$p_1 v = v_1 \cdot a_1 - \int_0^{v_1} a_1(v, v_2) dv \quad (1)$$

$$p_2 v = v_2 \cdot a_2 - \int_0^{v_2} a_2(v_1, v) dv \quad (2)$$

Proof: Consider for instance bidder 1—a standard argument shows that:

$$p_1(v) = v_1 \cdot c(v_2) - \int_0^{v_1} a_1(v, v_2) dv$$

is the only Incentive Compatible pricing scheme. Individual Rationality tells that $c(v_2) \geq 0$ and positive prices imply that $c(v_2) \leq 0$, implying that $c(v_2) = 0 \forall v_2$. Finally, by Observation 1, $(a_1(v) = 0) \to (p_1(v) = 0)$ ($a_1(v) = 0$ implies that $a_1(v', v_2) = 0$ for $v' < v_1$.

The previous observation points out that a deterministic mechanism is completely pinned down by its allocation rule. The pricing rule is determined by the allocation rule.

Consider a class of mechanisms $M = \{M^x, 0 \leq x \leq 1\}$ as described before, where $M^x = (a^x, p^x)$ (e.g., a mechanism is characterized by an allocation rule and a pricing rule). The following lemma outlines how the fair discounting axiom further pins down acceptable allocation rules. Define $S_i^x(v)$ as the surplus of bidder i when the discounted bidder gets a discount of x and the profile of valuations is v.

Lemma 1: For given $v_2$, suppose $\{v: a_1^0(v, v_2) = 1\} \phi$, and let $v_1$ be minimum v s.t. $a_1^0(v, v_2) =$. Then:

$$a_2^0(v, v_2) = 0 (= a_1(v, v_2)) \forall v < v_1.$$

Proof: Suppose not, e.g., for some $v' < v_1$, $a_2^0(v, v_2) = 1$. Firstly note that wlog, $S_2^0(v, v_2) > 0$. If not, pick $v'_2 = v_2 + \epsilon$, it is verified that $S_2^0(v, v_2) > 0$ (use Observations 1 and 2). Pick a discount $x \in [0,1]$ such that $$\frac{v}{1-x} > v_1.$$

By part of Fair Discounting axiom $S_1^x(v', v_2) > 0$ (because $$S_1^0\left(\frac{v}{1-x}, v_2\right) > 0 \bigg).$$

This implies (via NP) that $a_1^x(v', v_2) = 1$, and therefore $a_2^x(v', v_2) = 0$. However, this implies $S_2^x = 0$, whereas $S_2^0 > 0$, which violates part of Fair Discounting.

Applying the fact that $M_0$ must be anonymous (e.g., $a_1^0(v_1, v_2) = a_2^0(v_2, v_1)$ and vice versa), generically, $a^0$ determines $a^x$ for all $x>0$. Theorem 1 follows trivially from the above lemma.

Formally, the class of IC, IR, NP, and Fair discounting rules can be described as follows. Pick $c \in R$:

$$a^0(v_1, v_2) = \begin{cases} (0,0) & \text{if } (v_1 < c) \wedge (v_2 < c) \\ (0,1) & \text{if } (v_1 < c) \wedge (v_2 \geq c) \\ (1,0) & \text{if } (v_1 \geq c) \wedge (v_2 < c) \\ (0,0) & \text{if } (v_1 > c) \wedge (v_2 > c) \end{cases}$$

Further $a_1^x(v_1, v_2) = 1$ if $$a_1^0\left(\frac{v_1}{1-x}\right),$$

$v_2 = 1$. Note that IC, IR and NP are verified trivially by the fact that these allocation rules are as suggested by Observation 1 and the pricing rule $p^x$ is determined by equations (1) and (2). It should also be clear that these allocation rules are anonymous, by Lemma 2 they meet the fair discounting axiom.

A randomized mechanism in this setting is one for which a: $R_+^n \to [0, 1]^n$, i.e. we allow the mechanism to randomly allot at any given profile. The model component 302 may not be unable to characterize the class of randomized mechanisms that meet IC, IR, NP and Fair Discounting. Intuitively, this is because with randomization, there are too many 'free variables.' Further, a randomized IC mechanism cannot be written as convex combinations of deterministic IC mechanisms. A simple way to see this is to note that an auction where the two highest bidders get the good with probability 0.5 each can be made IC, but cannot be written as the convex combination of deterministic IC mechanisms—no deterministic IC mechanism (with NP) can allot the good to the second highest bidder.

However, a (non-deterministic) class of mechanisms can be specified that meets all the axioms. The idea behind the mechanism is that a priori, the system 300 'tosses a coin' to decide whether the discounted or the undiscounted bidders will get the good if at all. Suppose that the un-discounted bidders are selected. In this case the highest un-discounted bidder wins the good if his bid is the highest reported valuation across both groups. We should qualify that this is for profiles where there are no ties in valuations, handling ties is easy but complicates notation immensely. Formally:

$$a_i^0(v) = \begin{cases} 0.5 & \text{if } \left(v_i = \max\{v_j\}_{j=1}^n\right) \wedge (i \in B_R) \\ 0.5 & f\left(v_i = \max\{v_j\}_{j=1}^n\right) \wedge (i \in B_D) \\ 0 & \text{otherwise} \end{cases}$$

$$a_i^x(v) = \begin{cases} 0.5 & f\left(v_i = \max\{v_j\}_{j=1}^n\right) \wedge (i \in B_R) \\ 0.5 & f\left(v_i \geq \max\{v_j\}_{j=1}^n\right) \wedge \left(\frac{v_i}{1-x} \geq \max\{v_j\}_{j \in B_R}\right) \wedge (i \in B_D) \\ 0 & \text{otherwise} \end{cases}$$

The prices charged are as described in Equation (1) (with the appropriate scaling for discounted bidders). It can be seen that this mechanism meets IC, IR, NP, NT and Fair Discounting-IC, IR and NP follow from the fact that the pricing rule of Observation 2 is used. Non-triviality is verified (at least one of the highest valuation discounted bidder and the highest valuation un-discounted bidder win the good with probability 0.5). It is easy to see that $M^0$ is anonymous. To see that this class of mechanisms meet Fair Discounting, note that this mechanism can be thought of as a 0.5-0.5 randomization over 2 deterministic mechanisms. Mechanism 1 gives the good to the highest regular bidder if she is also the highest bidder overall (else withholds the good). Mechanism 2 (at discount rate x) always gives the good to the highest discounted bidder, if her valuation is more than $(1-x)$ of the highest regular bidder's valuation. Both mechanisms clearly meet Fair Discounting.

A drawback of this mechanism is that even for the 0 discount case, it achieves a worst case efficiency of 0.5. To see this, suppose the highest regular bidder also has the highest overall valuation v. The total social surplus generated v/2 whereas the efficient auction would generate a social surplus of v. However we can show that no mechanism that meets IC, IR, NP and Fair Discounting can do better.

Theorem 2: Any class of mechanisms M that meets IC, IR, NP and Fair Discounting must be such that $M^0$ achieves at most 0.5 efficiency in the worst case.

Proof: Suppose not, e.g., all profiles $v \in R_+^n$ are such that $a_i^0(v) > 0.5$ where $v_i = \max\{v_j\}_{j=1}^n$. In particular, consider the case where n=2, bidder 1 is the discounted bidder and bidder 2 is a regular bidder.

So suppose (for some $v_1$, $\epsilon$ small) $a_1^0(v_1, \epsilon) = \alpha > 0.5$. By anonymity $a_2^0(\epsilon, v_1) = \alpha$. Pick $x \in [0,1]$ such that $\epsilon/(1-x) \gg v_1$. By Fair discounting, $$a_1^x(\epsilon, v_1) = a_1^0\left(\frac{\epsilon}{1-x}, v_1\right).$$

Further, since the efficiency of this mechanism is known to be strictly better than 0.5, it must be the case $$a_1^0\left(\frac{\epsilon}{1-x}, v_1\right) > 0.5$$

(otherwise we can pick x arbitrarily close to 1 to violate this).

However, by the Fair Discounting, it can have $a_2^x(\epsilon, v_1) = a_2^0(\epsilon, v_2) = \alpha > 0.5$. This is clearly impossible, because it implies that at $v = (\epsilon, v_1)$; and x as given above, $a_1^x(v) + a_2^x(v) > 1$. It should be clear that this kind of argument can be embedded in cases where the number of bidders is larger than 2.

The theorem relies on the choice of x close to 1 (e.g., giving discounted bidders discounts of close to 100%). This may be unrealistic, in that maybe the designer knows a priori that the maximum discount he will offer is $\bar{x} < 1$, and therefore he only need concern himself with the class $M = \{M^x, 0 \leq x \leq \bar{x} \leq 1\}$. In this case there do exist mechanisms that have worst case efficiency strictly better than 0.5. Such a mechanism is outlined below, for the case of 2 bidders, one discounted (bidder 1) and one regular (bidder 2). One can extend the auction to if there are more than 2 bidders: at any given profile consider only the highest valuation discounted bidder and highest value regular bidder. Consider the following mechanism:

$$a^0(v_1, v_2) = \begin{cases} (0.6, 0.4) & \text{if } (v_1 > v_2) \\ (0.4, 0.4) & \text{if } (v_1 \geq (1-\bar{x})v_2) \wedge (v_1 \leq v_2) \\ (0.4, 0.6) & \text{if } (v_1 < (1-\bar{x})v_2) \end{cases}$$

Further for x<0.75:

$$a^x(v_1, v_2) = \begin{cases} (0.6, 0.4) & \text{if } (v_1 > (1-x)v_2) \\ (0.4, 0.4) & \text{if } (v_1 \geq (1-x)^2 \wedge (v_1 \leq (1-x)v_2)) \\ (0.4, 0.6) & \text{if } (v_1 < (1-x)^2 v_2) \end{cases}$$

It is verified that this class of mechanisms meets the Fair Discounting axiom (note that $a^x$ was defined simply to make this possible). IC, IR and NP follow from verifying that Observation 1 holds, and defining prices as per Observation 2. Finally, to calculate this mechanism's efficiency—note that in the regions, $v_1 > v_2$ and $v_1 < (1-\bar{x}) v_2$, the higher bidder gets the good with probability 0.6, and therefore worst case efficiency in these regions is 60%. In the region $(v_1 \geq (1-\bar{x}) v_2) \wedge (v_1 \leq v_2)$, if $\bar{x}=0.5$ (say) there is that worst case efficiency will be when $v_1=(1-x) v_2$ (lower buyer's valuation is as low as possible), and therefore social surplus $$0.4v_2 + 0.4\frac{v_2}{2} = 0.6v_2$$

implying worst case efficiency in this region is also 60%. It should be clear how one can extend this for $\bar{x}$ greater than 0.75. We also believe that for $\bar{x}$ small, we can achieve even better efficiency.

The model component 302 can define what it means to offer a 'discount'; and further offered a set of desiderata that such a mechanism should have. It turned out that no deterministic mechanism could satisfy all these axioms, while for randomized mechanisms, it is showed that any mechanism could have a worst case efficiency of at most 0.5. It turned out it could do better than 0.5 if a priori is known that the maximum discount to be offered was strictly less than 100%. It is not clear, however, whether this mechanism achieves the maximum possible efficiency, and it would be interesting to know what the maximum possible worst case efficiency is in this case.

It is to be further appreciated that the mathematic algorithms, theorems, mechanisms, observations, axioms, lemmas, proofs, etc. utilized by the model component 302 are solely for illustration purposes and not to be limited on the subject innovation. In other words, the model component 302 can employ most any suitable model, definition, and/or mechanism in order to implement a fair discounting auction and the above examples are just one of many possible techniques to achieve such goal.

Figure 4:
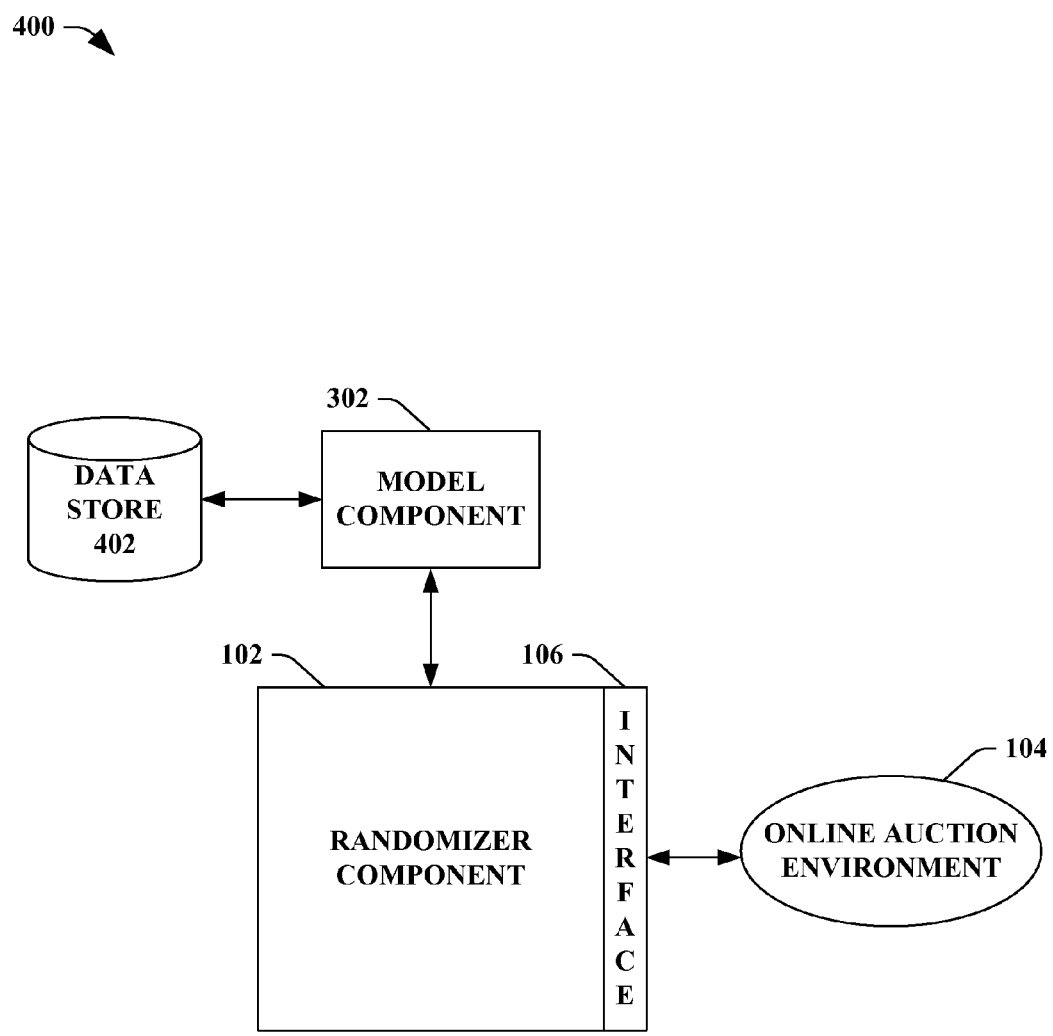
FIG. 4 illustrates a block diagram of an exemplary system that facilitates implementing an online auction in relation to ad units associated with online advertising.

FIG. 4 illustrates a system 400 that facilitates implementing an online auction in relation to ad units associated with online advertising. The system 400 can further include a data store 402 that can include any suitable data related to the randomizer component 102, the interface 106, the online auction component 104, a collection/group of bidders, the model component 302, etc. For example, the data store 402 can include, but not limited to including, randomizing techniques (e.g., equations, mathematical theorems, axioms, lemmas, proofs, computer programming code to implement a randomization technique, etc.), auction data (e.g., item/good, participants, identification of whether coupons or no coupons are selected, highest bidder, bidder identification data, etc.), online auction environment data (e.g., auction type, auction owner/initiator, auction host, auction location, auction historic data, etc.), and/or most any suitable data related to the system 400 that facilitates randomizing the selection of bidder collections to which a winner can be identified.

It is to be appreciated that the data store 402 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 402 of the subject systems and methods is intended to comprise, without being limited to, these and any other suitable types of memory. In addition, it is to be appreciated that the data store 402 can be a server, a database, a hard drive, a pen drive, an external hard drive, a portable hard drive, and the like.

Figure 5:
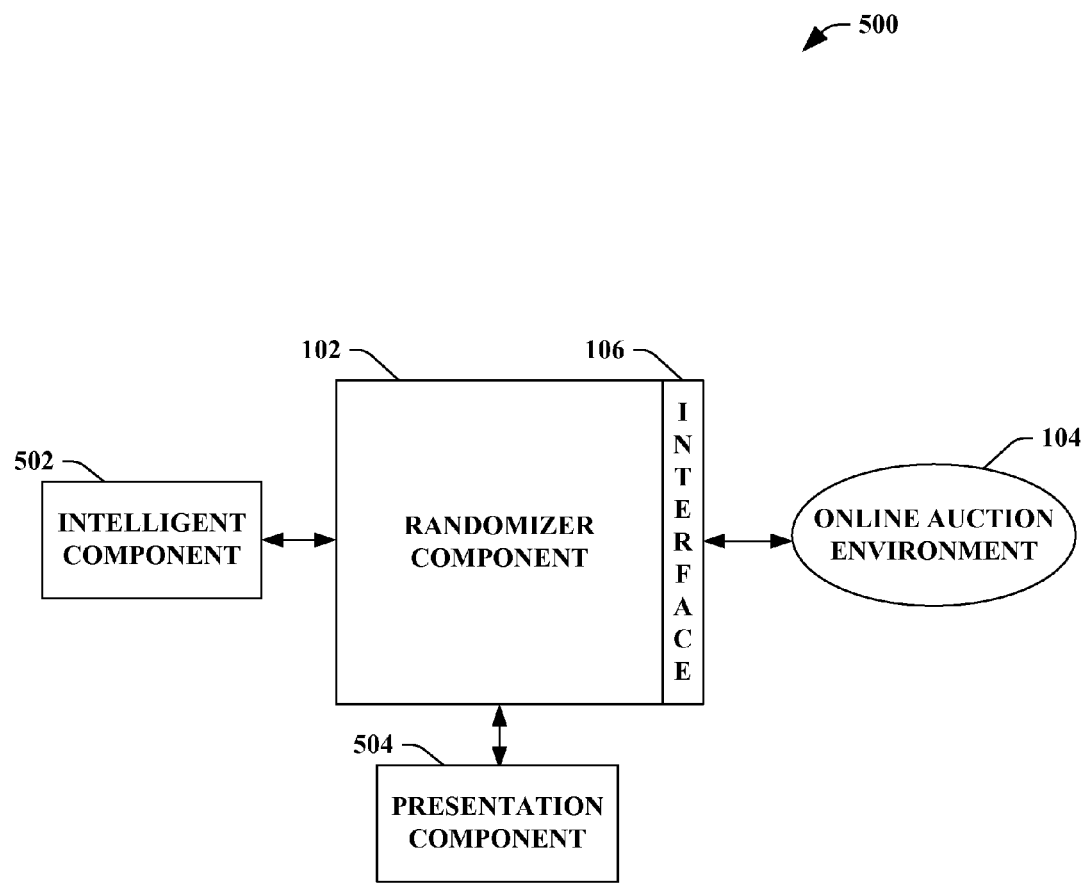
FIG. 5 illustrates a block diagram of exemplary system that facilitates administering a fair randomization technique in order to ascertain whether an online auction winner is identified from a pool of bidders having coupons or a pool of bidders not having coupons.

FIG. 5 illustrates a system 500 that employs intelligence to facilitate administering a fair randomization technique in order to ascertain whether an online auction winner is identified from a pool of bidders having coupons or a pool of bidders not having coupons. The system 500 can include the randomizer component 102, the online auction environment 104, and the interface 106. It is to be appreciated that the randomizer component 102, the online auction environment 104, and the interface 106 can be substantially similar to respective components, interfaces, and environments described in previous figures. The system 500 further includes an intelligent component 502. The intelligent component 502 can be utilized by the randomizer component 102 to facilitate employing a fair discount auction within the online auction environment 104. For example, the intelligent component 502 can infer auction participants, coupons existing within the collection of bidders, discounts available for auctions, validity of coupon/discount, percentage of coupons versus non-coupons for evaluation purposes, statistical data analysis for business model evaluation, etc.

It is to be understood that the intelligent component 502 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The randomizer component 102 can further utilize a presentation component 504 that provides various types of user interfaces to facilitate interaction between a user and any component coupled to the randomizer component 102. As depicted, the presentation component 504 is a separate entity that can be utilized with the randomizer component 102. However, it is to be appreciated that the presentation component 504 and/or similar view components can be incorporated into the randomizer component 102 and/or a stand-alone unit. The presentation component 504 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the randomizer component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 6:
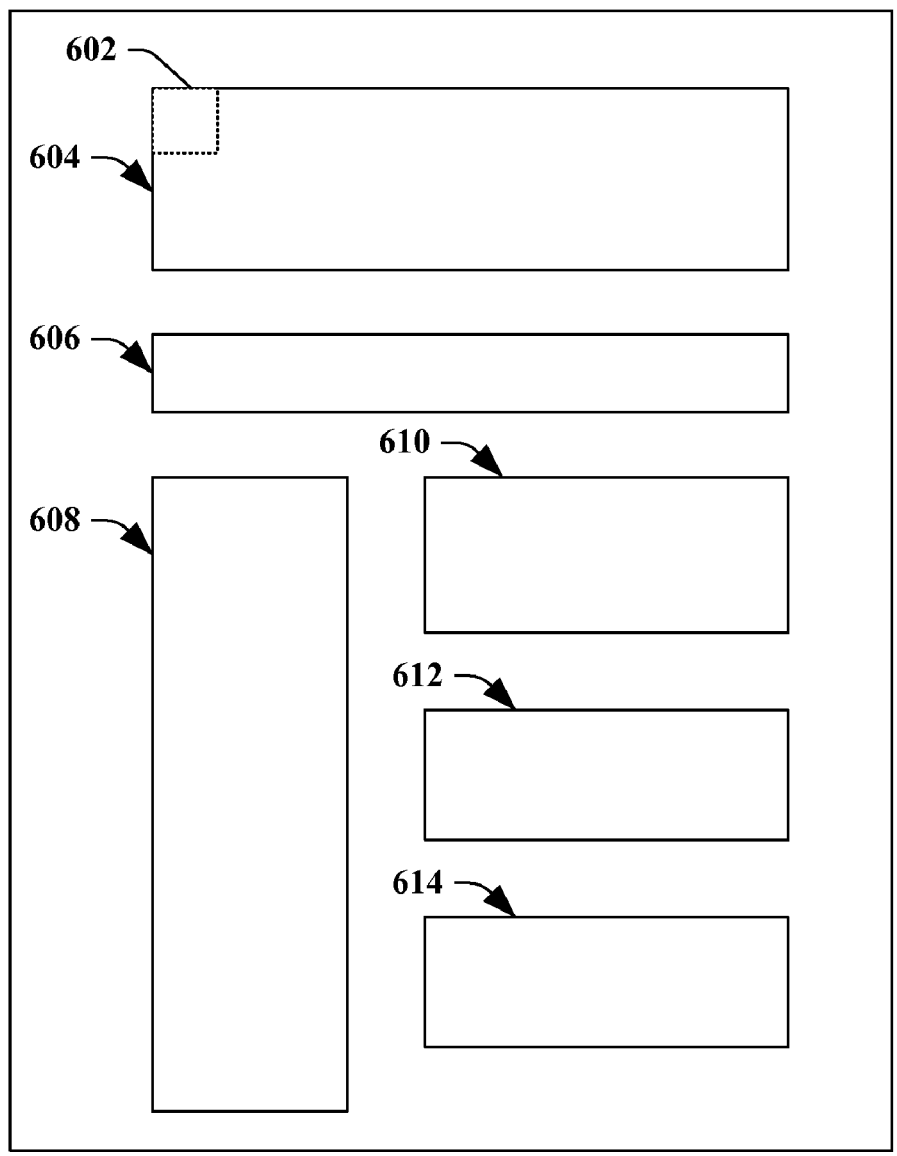
FIG. 6 illustrates a block diagram of an exemplary webpage including a portion of potential ad units to be sold at a determined price based on a market.

FIG. 6 illustrates a webpage 600 including a portion of potential ad units to be sold at a determined price based on a market. The webpage 600 can be an exemplary webpage, website, page, etc. that includes various groupings of potential ad units in specific positions as described herein. For instance, the webpage 600 can include most any suitable positions and/or groupings that can contain at least one potential ad unit 602. The webpage 600 can be partitioned and/or segregated into most any suitable number of groupings and/or positions in most any suitable configuration, location, etc. As illustrated, the webpage 600 is dissected into a first horizontal position 604, a second horizontal position 606, a left vertical position 608, a right top horizontal position 610, a right middle horizontal position 612, and a right lower horizontal position 612. Each position can include at least one potential ad unit such that the potential ad unit is the smallest segment for sale that can render a portion of an advertisement. Thus, each position can include multiple ads, each website can include multiple positions, and each webpage can include respective potential ad units and corresponding positions. For example, a website can include more than one webpage, wherein each webpage can include its own set of positions with potential ad units. Again for clarity, it is to be appreciated that most any suitable combination and/or grouping of potential ad units can be employed and the webpage 600 and depicted positions are for illustrative purposes only. Specifically, the claim subject matter can establish a current market price and/or value for a potential ad unit 602 within the first horizontal position 604 utilizing the spot market and/or auction environment.

Figure 7:
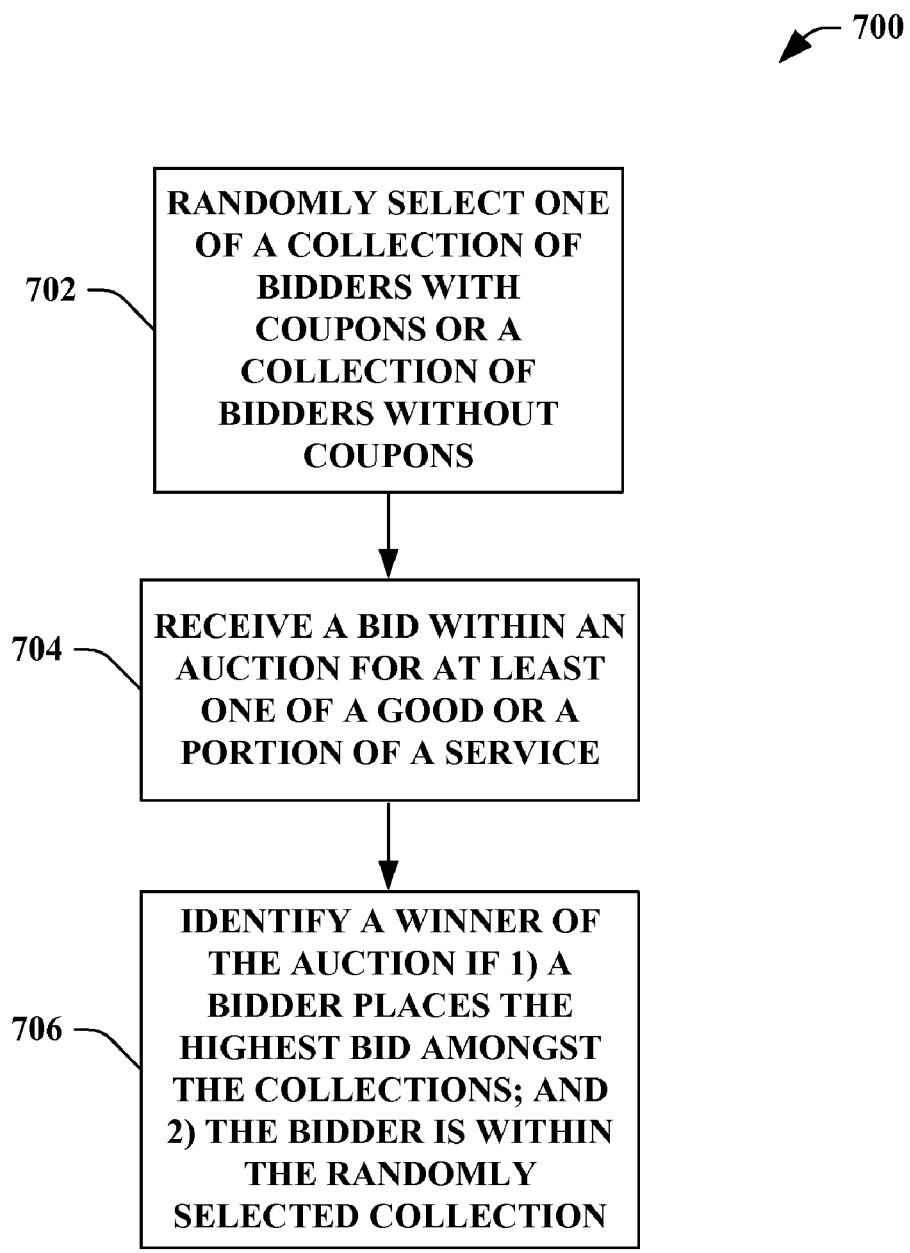
FIG. 7 illustrates an exemplary methodology for utilizing a coupon or a discount in an online auction environment in a uniform and/or fair manner.
Figure 8:
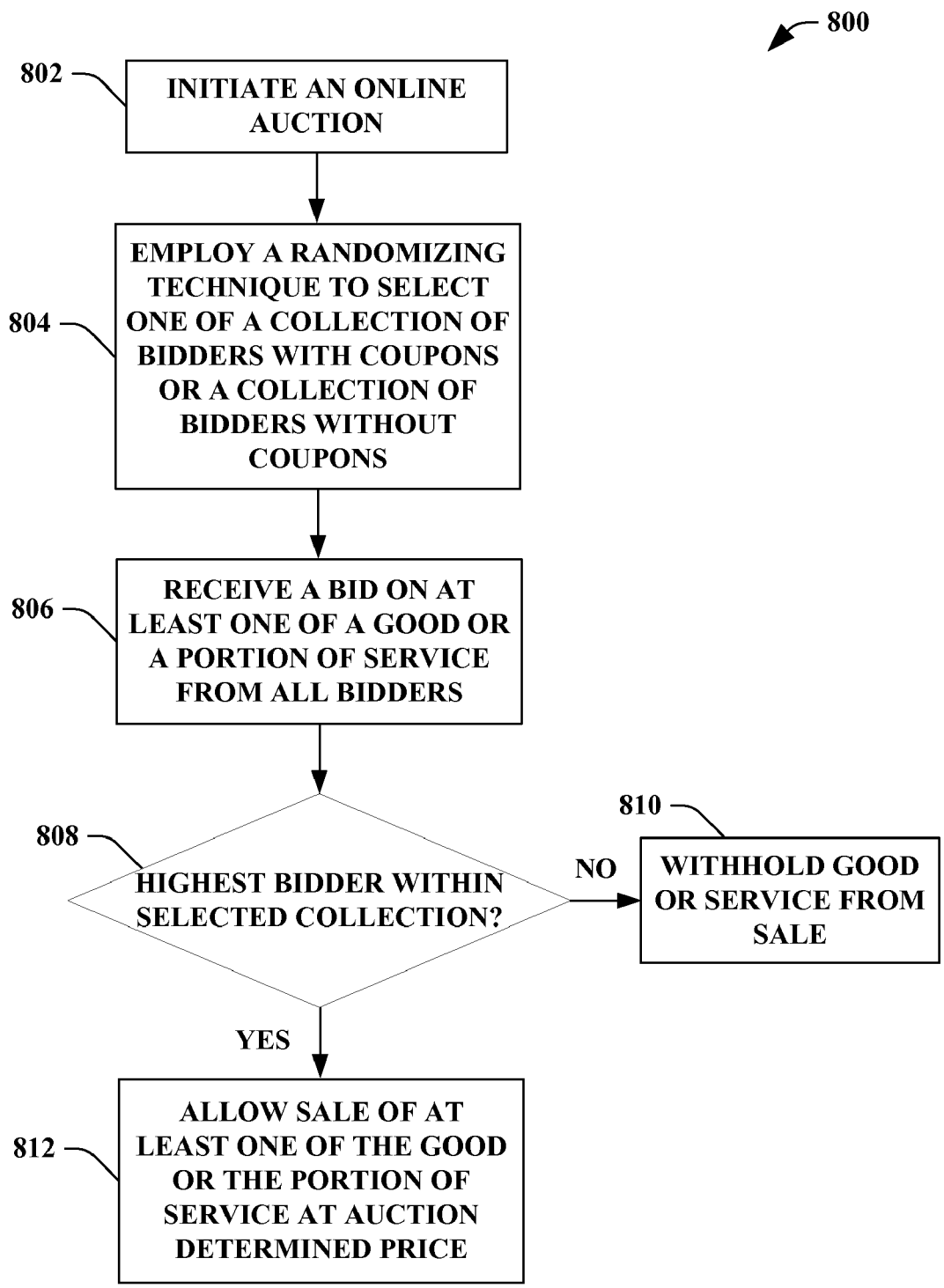
FIG. 8 illustrates an exemplary methodology for randomizing whether to select an auction winner from a collection of bidders with coupons or a collection of bidders without coupons.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates utilizing a coupon or a discount in an online auction environment in a uniform and/or fair manner. At reference numeral 702, one of a collection of bidders with coupons or a collection of bidders without coupons can be randomly selected. It is to be appreciated that the any suitable randomizing technique can be utilized to select a particular collection of bidders (e.g., between a collection of bidders with coupons/discounts or a collection of bidders without coupons/discounts), such as, but not limited to, a coin flip, a mathematical equation simulating random outcomes, a random number generator with numbers designating outcomes, a mathematical equation simulating a randomness of a coin flip, etc. By employing the randomizing technique for an online auction, the fairness of coupons associated therewith is more uniformly and fairly utilized in order to sustain the aspect of an online auction providing the fair market value of a good or service or a bidder's true fair market value of the good or service. Furthermore, it is to be appreciated that the coupon can be a discount, a promotion, a bundled product, a bundled service, a free good, a free service, a percent discount, a monetary value discount, a rebate, any monetary benefit bundled with a purchase, any benefit coupled with a purchase, etc.

At reference numeral 704, a bid within an online auction environment (e.g., the environment that employs the online auction) can be received, wherein the bid can be related to at least one of a good or a portion of a service. For example, the online auction environment can be any suitable environment that receives bids in order to identify a true market value and/or fair market value of at least one of a good or a portion of service. In other words, the online auction environment can employ any suitable auction such as, but not limited to, a standardized high-bid winner auction, a Vickrey auction, a Dutch auction, a second price auction, a silent auction, a sealed-bid auction, and a mixed goods auction.

At reference numeral 706, a winner of the auction is identified if the following are true: 1) a bidder submits and/or places the highest bid amongst both collections (e.g., the collection of bidders with coupons and the collection of bidders without coupons); and 2) the bidder is within the randomly selected collection. In other words, in order to win the auction, a bidder must be within the collection randomly selected (e.g., collection of bidders with coupons or collection of bidders without coupons) and be the highest bidder amongst the entire pool of bidders (e.g., collection of bidders with coupons and collection of bidders without coupons) participating in the online auction. For instance, a coin flip can be the randomizing technique in order to select whether a potential auction winner is identified within a collection of bidders with coupons or a collection of bidders without coupons. If the randomization technique selects the bidders with coupons, the auction winner must be within this selected collection and be the highest bidder amongst all collections.

FIG. 8 illustrates a method 800 for randomizing whether to select an auction winner from a collection of bidders with coupons or a collection of bidders without coupons. At reference numeral 802, an online auction can be initiated. The online auction can be any suitable online auction that receives bids in order to sell a good or a portion of a service. For example, the online auction can be a standardized high-bid winner auction, a Vickrey auction, a Dutch auction, a second price auction, a mixed goods auction, a silent auction, a sealed-bid auction, etc. At reference numeral 804, a randomizing technique can be employed to select one of a collection of bidders with coupons or a collection of bidders without coupons. It is to be appreciated that the randomizing technique can be implemented prior to the auction, during the auction, or at the end of the auction. For example, at the start of receiving bids, the randomizing technique can be utilized to select a collection of bidders.

At reference numeral 806, a bid can be received from all bidders regardless of collection association, wherein the bid relates to at least one of a good or a portion of service. In one example, the good or service can relate to an ad unit associated with online advertising. The ad unit can be sold to the highest bidder at the fair market value and/or true market value defined as the ad price. It is to be appreciated that the ad price can be a price related to most any suitable portion of an ad unit (e.g., also referred to as advertising unit). The subject innovation is intended to include most any suitable and/or potential ad unit utilized by a publisher for advertisement, wherein an ad unit can be a specific location on a page and/or website that an ad can be rendered.

At the conclusion of the online auction, a determination can be made whether or not the highest bidder amongst all bidders is within the randomly selected collection. In other words, a determination is made whether the selected collection (e.g., the collection of bidders with coupons or the collection of bidders without coupons) includes the highest bidder from the entire pool of bidders (e.g., all participants of the online auction regardless of collection membership). If the highest bidder is not within the selected collection, the methodology 800 continues to reference numeral 810. At reference numeral 810, the good or portion of service is can be withheld from sale at the online auction. Based upon the bidder not being within the randomly selected collection, the good or portion of service is not sold at the auction.

If the highest bidder is within the selected collection, the methodology 800 continues at reference numeral 812. At reference numeral 812, at least one of the good or portion of service can be allowed to sell in the online auction at the auction determined price. Thus, the highest bidder is amongst all participants within the online auction and is a member of the randomly selected collection of bidders. It is to be appreciated that once identified as the highest bidder and/or auction winner by having the highest bid amongst all bidders and being within the randomly selected collection of bidders (e.g., having coupons and not having coupons), the price of the good or service can be identified based upon the auction type (e.g., high bid conventional auction, $2^{nd}$ price auction, Vickrey auction, etc.).

For example, if the coupon bidders are randomly identified as the collection/group to which the winner can be identified, the price for the good or service can be the coupon bidders winning bid (e.g., the highest bid, the $2^{nd}$ highest price in a $2^{nd}$ price auction, etc.) including the coupon and/or discount. If the non-coupon bidders are randomly identified as the collection/group to which the winner can be identified, the price for the good or service can be the maximum price between 1) the price associated with the non-coupon bidders winning bid; and 2) the price associated with the coupon bidders highest bid including coupon and/or discount.

Figure 9:
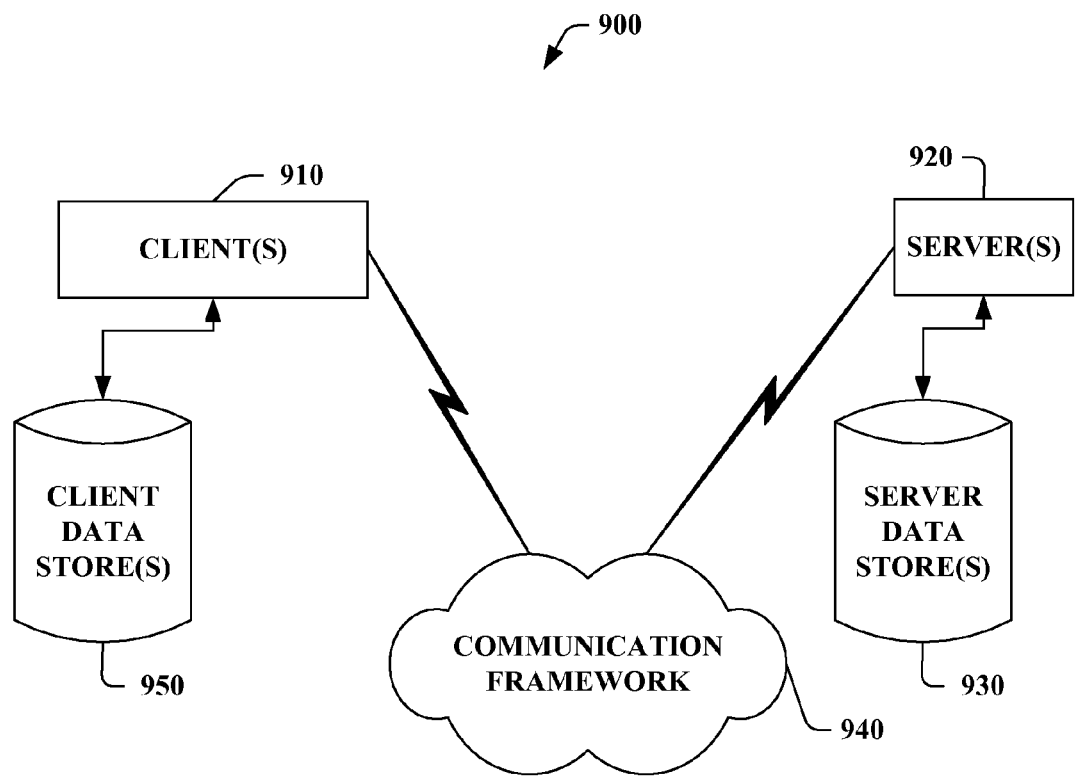
FIG. 9 illustrates an exemplary networking environment, wherein the novel aspects of the claimed subject matter can be employed.
Figure 10:
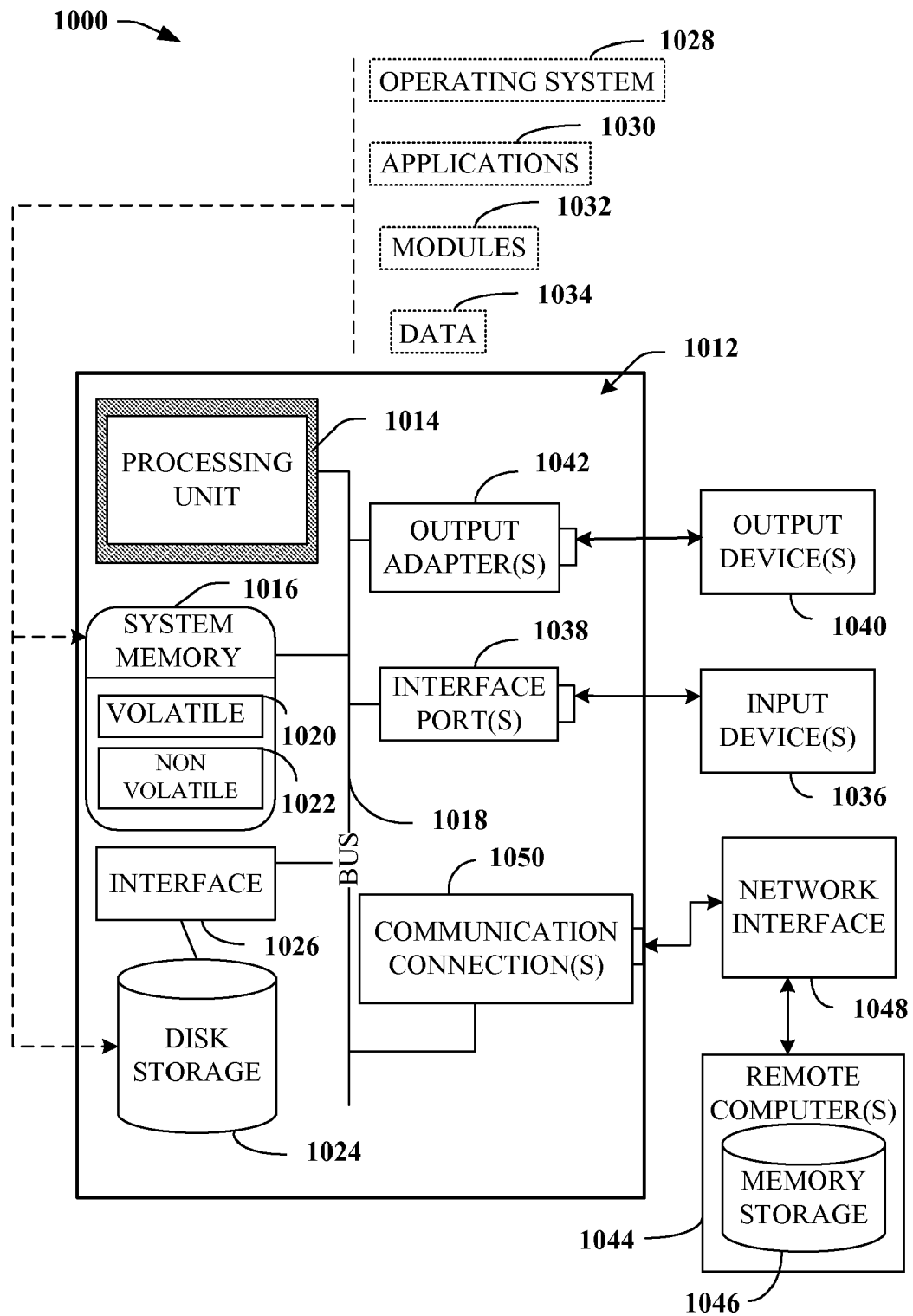
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a randomizer component that facilitates administering a coupon for a bidder within an online auction environment in a fair manner, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-readable medium having stored therein computer-executable instructions that, when executed by a processor, cause the processor to:
    employ an auction to identify a fair market value of at least one of a good or a portion of a service;
    receive at least one bid from a bidder with a coupon and a bidder without a coupon;
    randomly select one of a collection of bidders having coupons or a collection of bidders not having coupons based on a randomizing technique; and
    identify an auction winner as a highest bidder within the selected collection, the highest bidder providing a highest bid from both the collection of bidders having coupons and the collection of bidders not having coupons.

2. The computer-readable medium of claim 1, wherein the randomizing technique is at least one of a coin flip, a mathematical equation simulating a random outcome, a random number generator with a number designating an outcome, or a mathematical equation simulating a randomness of a coin flip.

3. The computer-readable medium of claim 1, wherein the coupon is at least one of a discount, a promotion, a bundled product, a bundled service, a free good, a free service, a percent discount, a monetary value discount, a rebate, or a monetary benefit bundled with a purchase.

4. The computer-readable medium of claim 1, wherein the good is an ad unit related to online advertising.

5. The computer-readable medium of claim 4, wherein the ad unit is utilized by a publisher to sell for advertising and is the smallest unit of the advertisement that can be rendered.

6. The computer-readable medium of claim 4, wherein the ad unit is sold at an ad price which is for the ad unit in a specific location on at least one of a website, a webpage, a page, or a site.

7. The computer-readable medium of claim 6, wherein the ad price is a price for the ad unit in terms of a measurement that correlates to an estimate of traffic for the ad unit.

8. The computer-readable medium of claim 7, wherein the measurement is at least one of a percent rotation for the advertisement, a cost/price per click (CPC), a price per 1000 impressions (CPM), a price per N impression, where N is a positive integer, or a unit of measurement related to a sale of a portion of the ad unit.

9. The computer-readable medium of claim 1, wherein the auction winner, if selected from the collection of bidders having coupons, pays a price associated with the highest bid including the coupon.

10. The computer-readable medium of claim 1, wherein the auction winner, if selected from the collection of bidders not having coupons, pays a price which is the maximum between 1) a price associated with the highest bid from the bidders not having coupons; and 2) a price associated with the highest bid from the bidders having coupons including the coupon.

11. The computer-readable medium of claim 1, wherein at least one of the good or the portion of service is withheld from the auction based upon the highest bidder not being within the randomly selected collection.

12. The computer-readable medium of claim 1, wherein the randomizing technique is employed during at least one of the following instances: before a start of an auction; a start of an auction; an end of an auction; a point of time between the start of the auction and the end of the auction; or after a conclusion of an auction.

13. The computer-readable medium of claim 1, wherein the auction is at least one of a standardized high-bid winner auction, a Vickrey auction, a Dutch auction, a second price auction, a silent auction, a sealed-bid auction, or a mixed goods auction.

14. A computer-implemented method that facilitates an online auction environment by utilizing a coupon, the method comprising:
- randomly selecting one of a collection of bidders with coupons or a collection of bidders without coupons by a computing device that is communicatively coupled to the bidders through a network;
- receiving, at the computing device, bids within an auction of at least one of a good or a portion of service; and
- identifying a winner of the auction when:
  1) a bidder submits a highest bid amongst the collection of bidders with coupons and the collection of bidders without coupons; and
  2) the bidder is within the randomly selected collection.

15. The method of claim 14, wherein the good is an ad unit associated with online advertising space related to at least one of a website, a site, a page, a webpage, or an Internet address.

16. The method of claim 14, further comprising randomly selecting the collection utilizing at least one of a coin flip, a mathematical equation simulating a random outcome, a random number generator with a number designating an outcome, or a mathematical equation simulating a randomness of a coin flip.

17. The method of claim 14, wherein the coupon is at least one of a discount, a promotion, a bundled product, a bundled service, a free good, a free service, a percent discount, a monetary value discount, a rebate, or a monetary benefit bundled with a purchase.

18. The method of claim 14, further comprising:
- withholding at least one of the good or the portion of service if the highest bid is not from the randomly selected collection.

19. The method of claim 14, wherein the auction is at least one of a standardized high-bid winner auction, a Vickrey auction, a Dutch auction, a second price auction, a silent auction, a sealed-bid auction, or a mixed goods auction.

* * * * *